US012192878B2

(12) United States Patent
Krishan (10) Patent No.: US 12,192,878 B2
(45) Date of Patent: Jan. 7, 2025

(54) METHODS, SYSTEMS, AND COMPUTER READABLE MEDIA FOR IDENTIFYING ALTERNATE DELIVERY ENDPOINTS FOR MOBILE ORIGINATED DATA AND MONITORING REPORTS IN A COMMUNICATIONS NETWORK

(71) Applicant: Oracle International Corporation, Redwood Shores, CA (US)

(72) Inventor: Rajiv Krishan, Bangalore (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 468 days.

(21) Appl. No.: 17/488,793

(22) Filed: Sep. 29, 2021

(65) Prior Publication Data

US 2023/0102122 A1    Mar. 30, 2023

(51) Int. Cl.
*H04W 40/34* (2009.01)
*H04W 40/02* (2009.01)

(52) U.S. Cl.
CPC .......... *H04W 40/34* (2013.01); *H04W 40/02* (2013.01)

(58) Field of Classification Search
CPC .............................. H04W 40/34; H04W 40/02
See application file for complete search history.

(56) References Cited

U.S. PATENT DOCUMENTS

| | | |
|---|---|---|
| 11,012,058 B2 | 5/2021 | Dubey et al. |
| 11,265,694 B2 | 3/2022 | Farooq |
| 11,611,626 B1 | 3/2023 | Srivastava et al. |
| 11,825,370 B2 | 11/2023 | Jayaramchar et al. |

(Continued)

FOREIGN PATENT DOCUMENTS

| | | |
|---|---|---|
| WO | WO 2020/202043 A1 | 10/2020 |
| WO | WO 2022/251324 A1 | 12/2022 |

OTHER PUBLICATIONS

US 11,483,406 B1, 10/2022, Srivastava et al. (withdrawn)
Notice of Allowance and Fee(s) Due for U.S. Appl. No. 17/386,649, (filed Jul. 18, 2023).
"5G; 5G System; Network Function Repository Services; Stage 3 (3GPP TS 29.510 V16.6.0 Release 16)" ETSI TS 129 510 V16.6.0, pp. 1-227 (Jan. 2021).
Non-Final Office Action for U.S. Appl. No. 17/386,649, (filed May 23, 2023).

(Continued)

*Primary Examiner* — Mohammad S Adhami
*Assistant Examiner* — Jesse P. Samluk
(74) *Attorney, Agent, or Firm* — Jenkins, Taylor & Hunt, P.A.

(57) ABSTRACT

A method for identifying alternate delivery endpoints for mobile originated data and monitoring reports in a communications network includes establishing, by a network exposure function (NEF) in a communications network, priority rules in a priority configuration database that define routing priority indicators corresponding to a plurality of applications functions (AFs) and receiving a service request or notification request message directed to one of the plurality of AFs from a consumer network function (NF) in the communications network. The NEF accesses a context database to validate context information associated with a destination AF belonging to the plurality of AFs. If the destination AF is unavailable or is not in proximity to the NEF, an event notification request message associated with the service request or notification request message is directed to a prioritized AF specified in the priority configuration database, wherein the prioritized AF is a peer of the destination AF.

20 Claims, 8 Drawing Sheets

(56) References Cited

U.S. PATENT DOCUMENTS

| | | | |
|---|---|---|---|
| 2016/0164680 A1* | 6/2016 | Liao | H04L 9/3213 |
| | | | 713/155 |
| 2017/0303259 A1 | 10/2017 | Lee et al. | |
| 2019/0124572 A1 | 4/2019 | Park et al. | |
| 2019/0223250 A1* | 7/2019 | Dao | H04W 72/23 |
| 2020/0136715 A1 | 4/2020 | Venugopal et al. | |
| 2020/0314615 A1* | 10/2020 | Patil | H04W 48/18 |
| 2020/0396132 A1 | 12/2020 | Wang et al. | |
| 2021/0058833 A1 | 2/2021 | Basu Mallick et al. | |
| 2021/0105196 A1* | 4/2021 | Dao | H04L 43/026 |
| 2021/0111985 A1 | 4/2021 | Mahalank et al. | |
| 2021/0211970 A1* | 7/2021 | Lee | H04W 28/0268 |
| 2022/0053372 A1* | 2/2022 | Shekhar | H04L 67/56 |
| 2022/0141662 A1* | 5/2022 | Liao | H04W 12/37 |
| | | | 726/1 |
| 2023/0007536 A1 | 1/2023 | Sharma | |
| 2023/0032054 A1 | 2/2023 | Jayaramachar et al. | |
| 2023/0232322 A1 | 7/2023 | Singh et al. | |
| 2023/0385161 A1* | 11/2023 | Lu | G06F 11/1464 |

OTHER PUBLICATIONS

"3rd Generation Partnership Project; Technical Specification Group Core Network and Terminals; 5G System; Network Exposure (NE) function services for Non-IP Data Delivery (NIDD); Stage 3 (Release 17)," 3GPP TS 29.541, V17.1.0, pp. 1-40 (Sep. 2021).

Commonly-Assigned, co-pending U.S. Appl. No. 17/386,649 for "Methods, Systems, and Computer Readable Media for Providing for Network Function (NF) Fallback to Recovered NF Repository Function (NRF)" (Unpublished, filed Jul. 28, 2021).

Commonly-Assigned, co-pending U.S. Appl. No. 17/334,268 for "Methods, Systems, and Computer Readable Media for Distributing Network Function (NF) High Availability (HA) Topology Information in a Core Network" (Unpublished, filed May 28, 2021).

"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).

"3rd Generation Partnership Project; Technical Specification Group Services and System Aspects; System architecture for the 5G System (5GS); Stage 2 (Release 17)" 3GPP TS 23.501 V17.0.0 (Mar. 2021).

"3rd Generation Partnership Project; Technical Specification Group Core Network and Terminals; 5G System; Technical Realization of Service Based Architecture; Stage 3 (Release 17)," 3GPP TS. 29.500, V17.2.0, pp. 1-100 (Mar. 2021).

"3rd Generation Partnership Project; Technical Specification Group Services and System Aspects; Procedures for the 5G System (5GS); Stage 2 (Release 17)," 3GPP TS 23.502, V17.0.0, pp. 1-646 (Mar. 2021).

Notice of Allowance and Fee(s) Due for U.S. Appl. No. 17/334,268, (filed Nov. 9, 2022).

Notification of Transmittal of the International Search Report and the Written Opinion of the International Searching Authority, or the Declaration for International Application No. PCT/US2022/030874 (Sep. 1, 2022).

"3rd Generation Partnership Project; Technical Specification Group Services and System Aspects; Study on enablers for network automation for the 5G System (5GS); Phase 2 (Release 17)," 3GPP TR 23.700-91, V17.0.0, pp. 1-382 (Dec. 2020).

Notice of Allowance for U.S. Appl. No. 17/334,268, (filed Jun. 6, 2022).

Applicant-Initiated Interview Summary for U.S. Appl. No. 17/334,268, (filed May 5, 2022).

"5G; System architecture for the 5G System (5GS) (3GPP TS 23.501 version 16.6.0 Release 16)," ETSI TS 123 501, V16.6.0, pp. 1-449 (Oct. 2020).

"5G; 5G System; Network function repository services; Stage 3 (3GPP TS 29.510 version 16.4.0 Release 16)," ETSI TS 129 510, V16.4.0, pp. 1-208 (Jul. 2020).

VMWare, "Configure Security VNF with HA", pp. 1-4 (Sep. 21, 2020).

Non-Final Office Action for U.S. Appl. No. 17/334,268, (filed Mar. 28, 2022).

Commonly-Assigned, co-pending U.S. Appl. No. 17/578,300 for "Methods, Systems, and Computer Readable Media for Prioritizing Among Alternate Network Function (NF) Instances" (filed Jan. 18, 2022).

"3rd Generation Partnership Project; Technical Specification Group Core Network and Terminals; Numbering, addressing and identification; (Release 17)," 3GPP TS 23.003, V17.3.0, pp. 1-145 (Sep. 2021).

"3rd Generation Partnership Project; Technical Specification Group Core Network and Terminals; 5G System; Principles and Guidelines for Services Definition; Stage 3 (Release 17)," 3GPP TS 29.501, V17.3.1 pp. 1-78 (Sep. 2021).

"3rd Generation Partnership Project; Technical Specification Group Core Network and Terminals; 5G System; Technical Realization of Service Based Architecture; Stage 3 (Release 17)," 3GPP 29.500, V17.4.0, pp. 1-109 (Sep. 2021).

"3rd Generation Partnership Project; Technical Specification Group Services and System Aspects; Procedures for the 5G System (5GS); Stage 2 (Release 17)," 3GPP TS 23.502, V17.2.1, pp. 1-712 (Sep. 2021).

"3rd Generation Partnership Project; Technical Specification Group Services and System Aspects; System architecture for the 5G System (5GS); Stage 2 (Release 17)," 3GPP TS 23.501, V17.2.0 pp. 1-542 (Sep. 2021).

"3rd Generation Partnership Project; Technical Specification Group Core Network and Terminals; 5G System; Network Function Repository Services; Stage 3 (Release 17)," 3GPP TS 29.510, V17.3.0, pp. 1-271 (Sep. 2021).

\* cited by examiner

| Area | Additional Rules | Routing Mode | Details | NEF Instances | AF and priority |
|---|---|---|---|---|---|
| DNN= DNN1 | IMSI= Range A-B | Override | All NEF instances are allowed to deliver notification based on configured priority. | Instance Id1 | • AF1 FQDN/IP, priority=1<br>• AF2 FQDN/IP, priority=2<br>• AF3 FQDN/IP, priority=3 |
| | | | | Instance Id2 | • AF1 FQDN/IP, priority=2<br>• AF2 FQDN/IP, priority=1<br>• AF3 FQDN/IP, priority=3 |
| | | | | Instance Id3 | • AF1 FQDN/IP, priority=3<br>• AF2 FQDN/IP, priority=2<br>• AF3 FQDN/IP, priority=1 |
| DNN = DNN1, DNN2 | IMSI, Range X – Y | Override | Same as above | Instance Id1 | • AF11 FQDN/IP, priority=1<br>• AF12 FQDN/IP, priority=2 |
| | | | | Instance Id2 | • AF11 FQDN/IP, priority=2<br>• AF12 FQDN/IP, priority=1 |
| | | | | Instance Id3 | • AF11 FQDN/IP, priority=2<br>• AF12 FQDN/IP, priority=1 |
| DNN = DNN2 | IMSI= Range A-B | Normal | Only NEF1 and NEF2 are allowed | Instance1 and Instance2 | • AF21 FQDN/IP, priority=1<br>• AF21 FQDN/IP, priority=1 |
| MONTE | IMSI= Range A-B | Normal | Only NEF1 and Instance1 is allowed | Instance1 | • AF31 FQDN/IP, priority=1 |

METHODS, SYSTEMS, AND COMPUTER READABLE MEDIA FOR IDENTIFYING ALTERNATE DELIVERY ENDPOINTS FOR MOBILE ORIGINATED DATA AND MONITORING REPORTS IN A COMMUNICATIONS NETWORK

TECHNICAL FIELD

The subject matter described herein relates to locating NEF elements and providing alternate delivery methods of mobile originated data in fifth generation (5G) and subsequent generation communications networks. More particularly, the subject matter described herein relates to methods, systems, and computer readable media for identifying alternate delivery endpoints for mobile originated (MO) data and monitoring reports in a communications network.

BACKGROUND

In telecommunications networks, a service endpoint is an address on a network node that uniquely identifies an entity that provides service to service consumers. The service endpoint can include an Internet protocol (IP) address or a combination of IP address and transport layer port number, which is also referred to as an IP endpoint.

In fifth generation (5G) telecommunications networks, the network node that provides service is referred to as a producer network function (NF). A network node that consumes services is referred to as a consumer NF. A network function can be both a producer NF and a consumer NF depending on whether it is consuming or providing service.

A given producer NF may have many service endpoints. Producer NFs register with a network function repository function (NRF). The NRF maintains an NF profile of available NF instances and their supported services. Consumer NFs can subscribe to receive information about producer NF instances that have registered with the NRF. Once registered, NF instances in the 5G network may establish sessions with one or more network exposure functions (NEFs). Notably, the NEF is a 3GPP network function that provides a means to securely expose the services and capabilities provided by producer network functions servicing the network.

At present, 5G routing as defined by 3GPP utilizes binding information associated with a NEF to indicate a suitable target NF producer instance(s) for a number of network function events such as, NF service instance selection, NF service instance reselection, and routing of subsequent requests associated with a specific NF producer resources and NF services. In particular, binding information allows an NF to indicate that the NF scope, for a particular context, that should be bound to an NF service instance, NF instance, NF service set, or NF set depending on local policies and other criteria. Notably, when an NEF has peers with shared context information (e.g., a common context database), the NEF can be configured to push its binding information to a NF service set or an NF set. Thus, in the event a primary NEF instance (e.g., an NEF that handled an initial SMContext_Create request from a consumer NF, such as a session management function (SMF)), fails or otherwise becomes unavailable, the consumer NF can send a MO data request or a monitoring data request to an alternate (or peer) NEF instance. Although 3GPP standards permit a NEF to publish its binding information to consumer NFs, there is currently no mechanism that permits an application function instance to provide binding information with an NEF for alternate selection during overload or other failure scenarios.

Accordingly, there exists a need for improved identifying alternate delivery endpoints for MO data and monitoring reports in a communications network.

SUMMARY

Methods, systems, and computer readable media for identifying alternate delivery endpoints for mobile originated data and monitoring reports in a communications network are disclosed. One example method includes establishing, by a network exposure function (NEF) in a communications network, priority rules in a priority configuration database that define routing priority indicators corresponding to a plurality of applications functions (AFs) and receiving, by the NEF, a service request or notification request message directed to one of the plurality of AFs from a consumer network function (NF) in the communications network. The method further includes accessing, by the NEF, a context database to validate context information associated with a destination AF belonging to the plurality of AFs. In response to determining that the destination AF is unavailable or is not in close proximity to NEF, the method further includes directing an event notification request message associated with the service request or notification request message to a prioritized AF specified in the priority configuration database, wherein the prioritized AF is a peer of the destination AF.

According to another aspect of the method described herein, the service request or notification request message received from the consumer NF is a deliver service request message received from a session management function (SMF) in the communications network.

According to another aspect of the method described herein, the service request or notification request message received from the producer NF is a monitoring report request message received from a Access and Mobility Management Function (AMF) or Unified Data Management (UDM) in the communications network.

According to another aspect of the method described herein, the notification request message is directed to the prioritized AF if an entry identifying the prioritized AF in the priority configuration database further includes a parameter indicating an override condition.

According to another aspect of the method described herein, the priority configuration database is auto-replicated among a plurality of NEFs in a NF set or NF service set related to the NEF.

According to another aspect of the method described herein, providing, by the NEF, priority binding information associated with the priority rules via request messages directed to a plurality of consumer NFs in a communications network.

According to another aspect of the method described herein, entries of the priority configuration database maps each of a plurality of NEF instances to a plurality of application functions, wherein each application function is identified by a context identifier and a priority identifier.

The subject matter described herein may be implemented in hardware, software, firmware, or any combination thereof. As such, the terms "function" "node" or "module" as used herein refer to hardware, which may also include software and/or firmware components, for implementing the feature being described. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for identifying alternate delivery endpoints for MO data and monitoring reports in a communications network. In 5G communications networks, there are defined techniques to enable a network exposure function (NEF) to share context information with peer NEFs via messages that include binding headers. This mechanism is notably valuable to ensure network stability in instance where an original or primary NEF instance fails or otherwise becomes unavailable by enabling a consumer NF (e.g., a service management function (SMF)) to send MO data requires and/or monitoring request to alternate NEF instances associated with a common NF service set or NF set. However, there is currently no way for certain NFs (e.g., application functions) to publish binding information with NEFs or identify their respective peers in a similar manner. Accordingly, the disclosed subject matter describes a method for enabling a network operator to assign priority indicators that can be used to facilitate the alternate selection of such NFs (e.g., application functions) during overload conditions or network failures.

Figure 1:
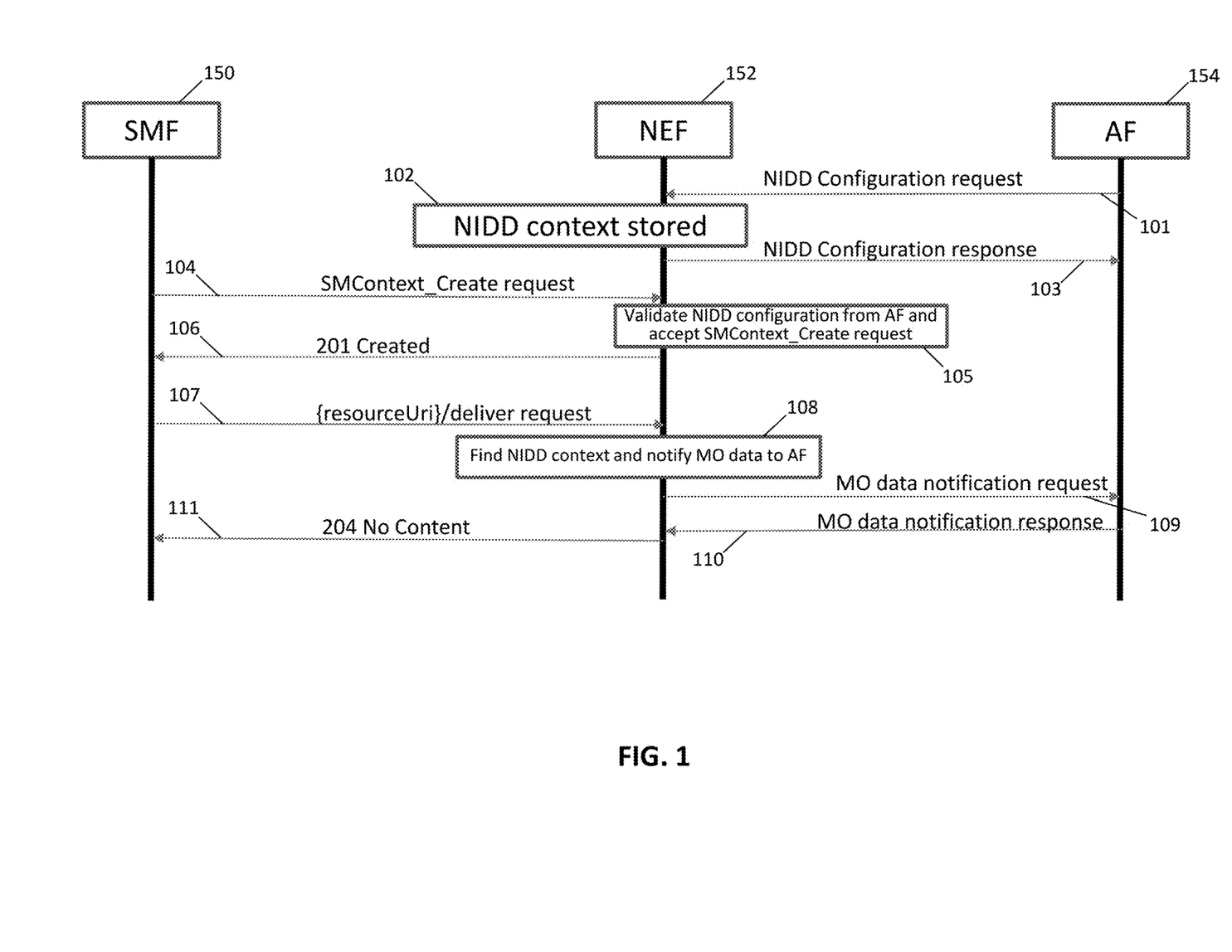
FIG. 1 is a message flow diagram illustrating a network exposure function (NEF) routing non-IP data delivery network traffic under normal conditions.

Prior to describing the disclosed subject matter, scenarios of common network flow processing by the NEF are presented herein. For example, in FIG. 1, an SMF 150, an NEF 152, and an application function (AF) 154 are depicted as communicating messages pertaining to an existing non-IP data delivery (NIDD) network traffic flow under normal conditions. In particular, the NIDD flow traverses NEF 152, which attempts to establish a communication session between SMF 150 and application function 154. As shown in FIG. 1, application function 154 is operating as a consumer NF that sends a NIDD configuration request message 101 to NEF 152. In some embodiments, the configuration request message includes parameters identifying a user equipment that is related to the context configuration being requested. After receiving the configuration request message 101, NEF 152 is configured to store the configuration data in a local database (see block 102). Notably, the configuration data is stored as NIDD context information. Afterwards, NEF 152 waits for SMF 150 or an associated user equipment to initiate a NIDD session. For example, if a user equipment initiates a session, SMF 150 subsequently initiates a SMContext create request message 104 (e.g., a setup SMCreate session request message associated with the AF's NIDD request resource) that is directed to NEF 152. Upon receiving request message 104, NEF 152 is configured to access a context database and validate the NIDD configuration associated with AF 154 (see block 105). In some examples, the context database contains entries of context data for each AF that includes, but not limited to, a uniform resource identifier (URI), a uniform resource locator (URL), a fully qualified domain name (FQDN), and/or an Internet protocol (IP) network address associated with each AF. Once the configuration is validated, NEF 152 can create a mapping of the two sessions (e.g., NEF's session with SMF 150 and NEF's session with AF 154) and accept request message 104.

Afterwards, NEF 152 is configured to send an acknowledgment message 106 (e.g., a 201 Created message) to SMF 150. At this stage, mobile originated data flow (e.g., MO delivery request message 107) is directed by SMF 150 to NEF 152. In response to receiving data flow and/or request message 107, NEF 152 is configured to find the relevant NIDD context information stored in the local database (e.g., see block 108). In particular, NEF 152 utilizes the NIDD context data stored in the priority configuration database to identify the appropriate serving AF (i.e., AF 154) the mobile originated data should be sent. For example, NEF 152 can send a notification request 109 (e.g., MO data notification request) to application function 154 using the application programming interface (API) provided by the application function during the initial configuration stage. In response, application function 154 returns a notification response message 110 (e.g., MO data notification response) to NEF 152, which in turn sends a 204 'no content' message 111. Message 111 serves as an indication to SMF 150 that the MO data notification request 109 was successfully delivered.

It should be noted that in FIG. 1, there is no UPF involved in the communication of the NIDD flow. In particular, these types of traffic flows are non-IP flows originating from an SMF directed directly toward the application function (i.e., there is no direct data path from the user equipment to the application function since the user equipment does not have an assigned IP address).

Figure 2:
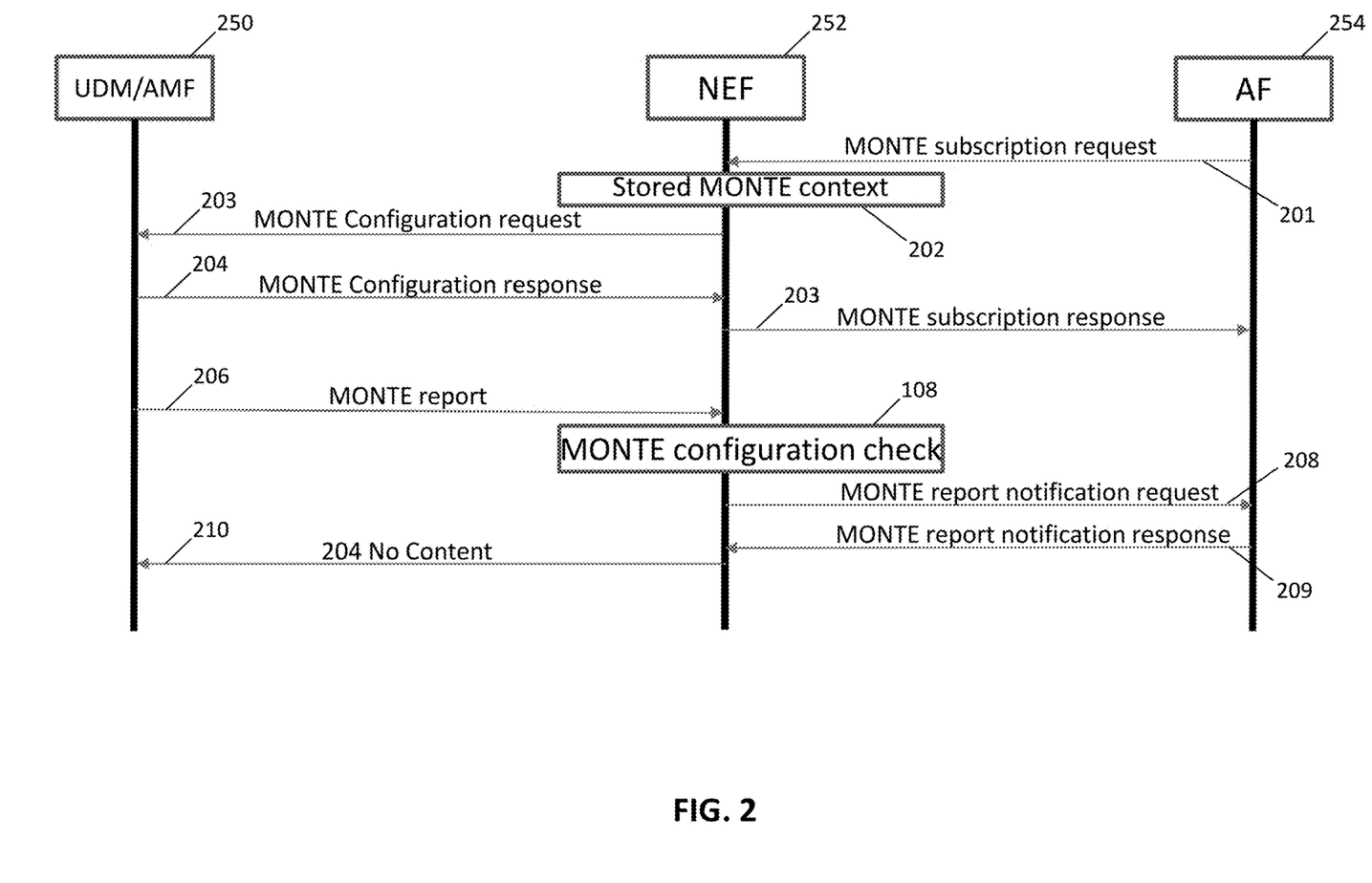
FIG. 2 is a message flow diagram illustrating a NEF monitoring network traffic under normal conditions.

FIG. 2 is a message flow diagram illustrating a NEF that monitors network traffic flows under normal conditions. In particular, FIG. 2 illustrates a consumer network function 250 (e.g., a unified data management (UDM) function or access and mobility management function (AMF)), an NEF 252, and an application function 254 communicating monitoring flow messages. In some embodiments, application function 254 can be configured to issue a subscription request for various monitoring events (e.g., tracking the user equipment location, tracking the user equipment service area, and/or tracking the user equipment's reachability). In particular, there are various types of monitoring subscriptions that an application function can subscribe to. Notably, the network traffic flow for the monitoring subscriptions depicted in FIG. 2 are 3GPP defined and similar to the NIDD traffic flow messaging depicted in FIG. 1. For example, after receiving subscription request message 201 (e.g., a monitoring event (MONTE) subscription request) from application function 254, NEF 252 is configured to store the monitoring request and its associated context information (e.g., MONTE context data) in a local context configuration database (see block 202). In some embodiments, the monitoring context information includes information identifying the UE being monitored. NEF 252 is then further configured to push a configuration request message 203 (e.g., a MONTE configuration request) that contains the "monitoring events" configuration information towards a producer NF, generally represented as UDM/AMF 250. Notably, the configuration information indicates the specific event(s) that NEF 252 is adapted to monitor with regard to a particular user equipment (UE) for application function 254. After receiving a monitoring configuration response message 204 from UDM/AMF 250, NEF 252 is configured to direct a monitoring subscription response message 205 to application function 254.

When one of the monitored events specified in the provided configuration information occur at a producer NF endpoint (e.g., one or more of the UDM/AMF 250), a monitoring report 206 will be triggered by the relevant endpoint and sent to NEF 252. Notably, NEF 252 extracts the event information and conducts a monitoring configuration check (e.g., see block 207). Namely, NEF 252 can utilize the mapping of events to the context information stored in configuration database to determine the designated destination application function. NEF 252 then sends a monitoring report notification request 208 to the designated destination application function 254. In response, application function 254 sends a monitoring report notification response 209 to the NEF 252, which in turn sends a 204 'no content' message 210 to the consumer NF 250 (e.g., UDM/AMF) as an indication of successful delivery.

As described above, binding information pertains to the information an NEF uses to notify a producer or consumer NF (e.g., an SMF) of its priority information and/or configuration information (e.g., a monitoring configuration or a NIDD configuration). Notably, the binding information can be placed in the binding header of messages communicated to the SMF. For example, an NEF can inform a SMF of fellow peer NEFs that could be used to maintain session continuity if the original NEF fails or becomes unavailable. For example, the SMF can initiate the creation of a session to be established with an AF via an NEF. During the session creation process, the NEF (e.g., 'NEF1') can include binding information in the binding header of the session response message to inform the SMF that if the first NEF becomes unavailable, then the SMF may contact a paired mate (e.g., 'NEF2') of the first NEF. In particular, the paired mate can be used for continuity of the session between the SMF and the AF.

In some embodiments, binding information can be used to indicate a suitable target NF instance (e.g., an AF instance) for NF service instance selection, NF service instance reselection, and routing of subsequent requests associated with a specific NF resource and/or service. This allows the NF producer to indicate that the NF consumer, for a particular context, should be bound to an NF service instance, NF instance, NF service set, or NF set depending on local policies and other criteria.

Figure 3:
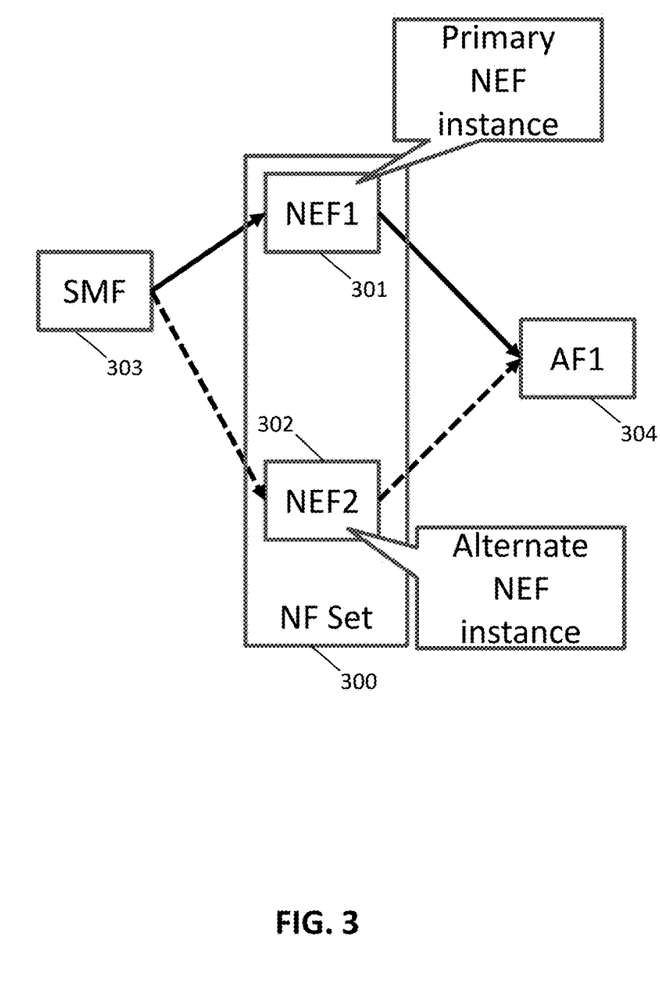
FIG. 3 is a block diagram illustrating a NEF conducting fifth generation (5G) routing under normal conditions.

Thus, when an NEF has peers (e.g., other NEFs included in the same NF set or NF service set) configured to share context information, an NEF can also be configured to push its binding information as an NF service set or an NF set (e.g., see NF set 300 in FIG. 3). Such a mechanism allows for an alternate delivery endpoint for sending SMFs. For example, in FIG. 3, if a primary NEF instance 301 is unavailable (e.g., the NEF that handled the SMContext_Create request from an SMF has failed), SMF 303 can send a MO data request or monitoring data request to a specified alternate NEF instance (e.g., NEF 302 in FIG. 3). More specifically, SMF 303 is shown to establish a first session with NEF1 301 (e.g., the solid arrow) in NF set 300. Further, NEF2 302 in NF Set 300 can function as the alternate NEF instance as indicated in the binding information should NEF 301 become unavailable.

However, unlike the functionality afforded to the NEF by 3GPP standards, there is currently no way for an AF to publish binding information with the NEF for alternate AF selection (i.e., selection of a peer AF if the first AF fails) during overload conditions, network failures, and/or software failures. For example, in the event of an AF endpoint failure, the NEF does not have any alternate routing flexibility as compared to other NFs in 5G core network. Moreover, an AF (e.g., an AF located outside of an operator's trusted domain) cannot register with an NRF, which could be configured to possibly help the NEF perform alternate routing through NRF discovery procedures.

Figure 4:
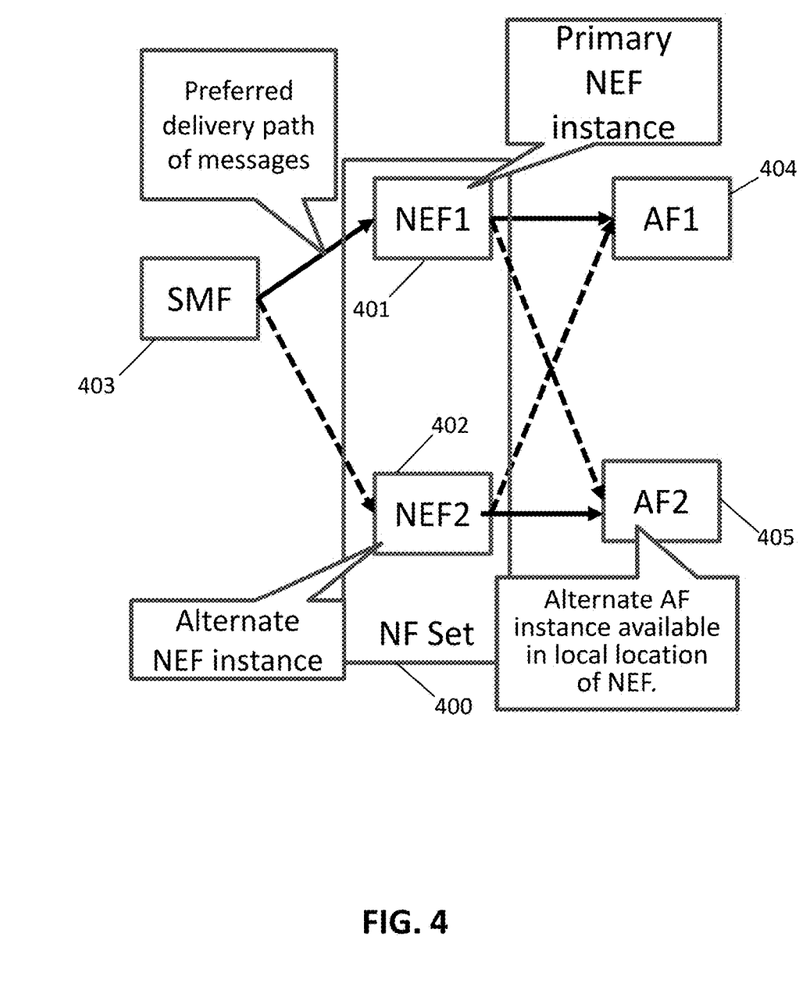
FIG. 4 is a block diagram illustrating a NEF conducting 5G routing under a problematic condition.

FIG. 4 is a block diagram illustrating a NEF conducting 5G routing under a problematic condition. For example, during the NEF's alternate routing process (e.g., NEF1 401 becomes unavailable), an alternate instance of the NEF (e.g., NEF2 402, which is a peer of NEF1 401) may send a notification to the AF instance (e.g., AF1 404) that has published its endpoint to the original NEF1 during the context creation process. Thus, even if there is an alternate AF server instance (e.g., AF2 405) that is available and located in close/local proximity to alternate NEF2 402, NEF2 402 is still currently designed to send notification to alternate AF server instance (as opposed to primary AF1 server 404). As used herein, "proximity" to the NEF can be understood to mean the AF is within the "locality" or "service scope" of the NEF (e.g., the alternate AF is available in local service scope of the NEF). In addition, proximity can also mean that the proximate AF is an AF that has been assigned and/or configured with a higher priority AF by the network operator. In some embodiments, the endpoint can be identified by an FQDN or IP address of the AF server.

Figure 5:
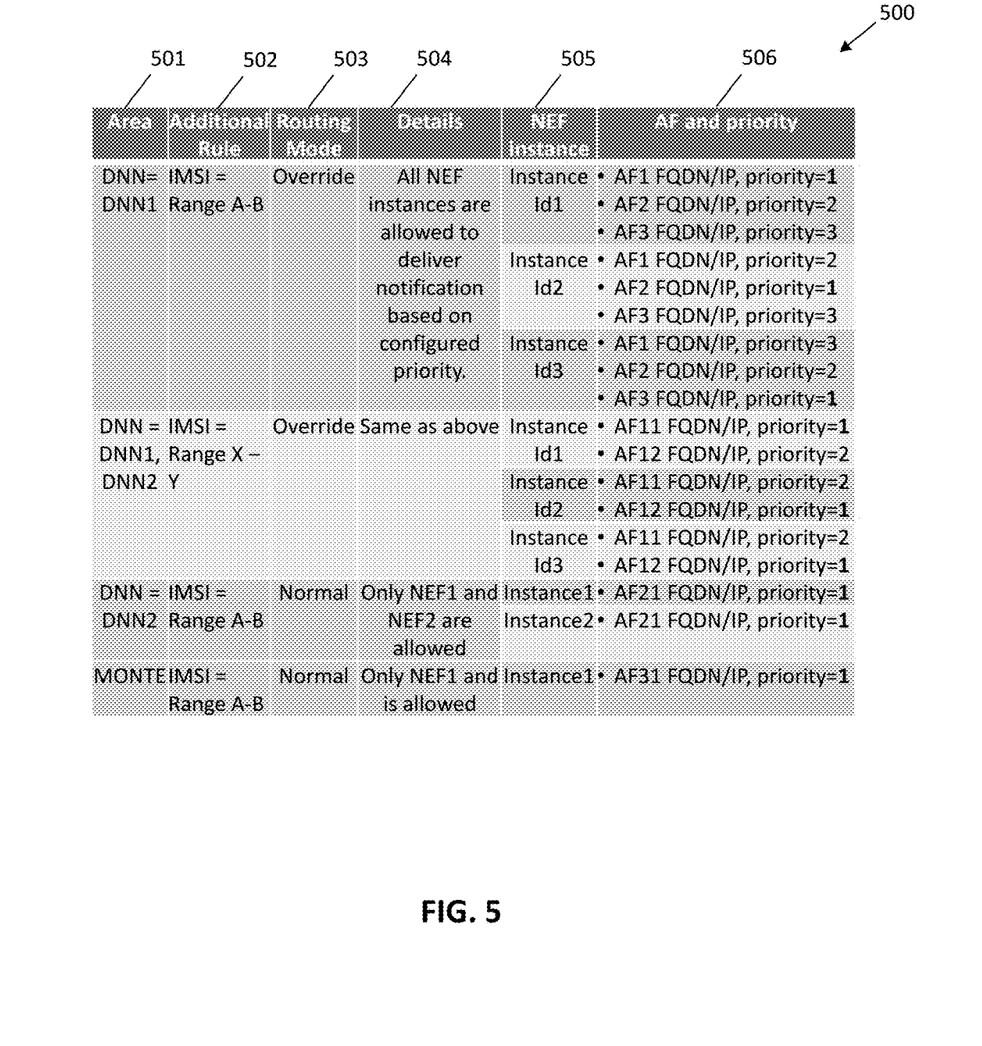
FIG. 5 depicts a priority configuration database table utilized by one or more NEFs according to an embodiment of the subject matter described herein.

FIG. 5 depicts a priority configuration database table utilized by one or more NEFs (and/or its priority configuration engine as described below) according to an embodiment of the subject matter described herein. In particular, priority configuration database table 500 can be configured by a network operator to create rules to define and prioritize alternate application function endpoints for different scenarios as shown in FIG. 5. Exemplary priority configuration database table 500 includes an area column 501, an additional rule column 502, a routing mode column 503, a details column 504, an NEF instance column 505, and an AF and priority column 506. It is understood that priority configuration database table 500 can include additional or fewer columns without departing from the scope of the disclosed subject matter. In some embodiments, a network operator can configure the NEF instances to operate and manage priority configuration database table 500 in accordance to a shared data model. For example, the sharing of a priority configuration database table 500 that contains a configuration and is initially provisioned on a single NEF instance. Notably, the priority configuration database can be automatically replicated ("auto-replicated") on all the other NEF instances. If the priority configuration database is not replicated in this manner, then the network operator may alternatively choose to conduct and manage this configuration on each of the individual NEF instances.

Referring to table 500 in FIG. 5, area column 501 includes data network name (DNN) identifiers identifying the networks serviced by the listed NEF instances and AF endpoints identified in columns 505-506. Additional rule column 502 includes a list and/or a range of international mobile subscriber identity (IMSI) identifiers serviced in the DNN identified in column 501. Routing mode column 503 identifies the routing mode related to the rule entry. Routing modes can include "normal" or "override" as discussed further below. Details column 504 provides an entry for including notes or descriptions related to the rule entry. NEF instance column 505 lists each of the NEF instances included in the particular service area/DNN. In particular, column 505 contains the instance ID of each NEF for which a given routing rule applies. In some embodiments, the instance ID is a unique identifier for each NF that is published as part of an NFProfile to the NRF. Likewise, column 506 lists the AF identifiers and corresponding priority as related to each particular NEF instance indicated in column 505. In particular, the priority indicators designated the priority order of the AF endpoint in which the particular NEF instance listed in column 505 attempts to utilize to establish a session.

In some embodiments, a network operator may configure, provision, or modify certain parameters for one or more entries of configuration table 500. For example, a network operator can configure the priority indicators (e.g., see column 506 of table 500) associated with a particular DNN and/or IMSI range (e.g., see columns 501-502). These entry parameters can generally be used by the NEF instance to assign and prioritize application functions as alternative endpoints for each of a plurality of NEF instances present in a particular DNN (and/or NF service set). More specifically, each entry of configuration table 500 can establish the binding priorities between each of a plurality of NEF instances and different application function endpoints. To illustrate, the column 505 entry in row 1 of configuration table 500 includes three separate NEF instances (e.g., 'instance ID1', instance ID2', and 'instance ID3') that are respectively mapped to three application functions in accordance with specific priority indicators. Notably, this first row of table 500 identifies a specific data network (e.g., 'DNN1') and corresponding IMSI range (e.g., 'IMSI=range A-B'). Moreover, this first row of configuration table 500 also indicates NEF instance ID1 is bound to AF1 (which is further identified by a unique FQDN/IP identifier) with a priority indicator of 1. Notably, "priority=1" indicates the primary binding priority existing between AF1 and NEF1. Likewise, the binding priority between NEF1 and AF2 is indicated by "priority=2" and the binding priority between NEF1 and AF3 is defined by "priority=3" (e.g., see first entry in column 506). Similarly, configuration table 500 indicates the priority binding existing between NEF2 and AF2 is the primary binding (e.g., "priority=1"). Likewise, the binding priority between NEF2 and AF1 is indicated by "priority=2" and the binding priority existing between NEF2 and AF3 is indicated by "priority=3". Accordingly, the network operator can utilize configuration table 500 by adding or modifying table entries in this manner to bind multiple AF endpoints to various NEF instances (e.g., by assigning different priorities in the entries of configuration table 500).

In some embodiments, the disclosed methodology associated with the operation of the priority configuration database can be executed by an NEF instance and/or a 'priority configuration engine' supported by the NEF instance. For example, the priority configuration engine can be an algorithm, program, or script stored in memory that when executed by a processor performs the following steps and/or logical operations. In some embodiments, priority configuration engine represents a list of steps (or changes in steps) embodied in a state machine (e.g., either via software code programming or via a set of rules) of the NEF instance.

After a network operator creates and establishes rules defining the alternative routing priorities of various application functions in priority configuration database table 500, an NEF instance with access to the priority configuration database can specify binding headers in request messages that are sent by the NEF instance to select NFs (e.g., SMF, AMF, UDM, etc.) operating in the core communications network. For example, in the scenario where DNN=DNN1 and IMSI range=range A-B (e.g., columns 501-502 in first row in table 500), the NEF instance can publish or set the binding scope (i.e., binding information) for its associated NF Set and/or NF Service Set in response to receiving and accepting the SMContext_Create request message from the SMF. Receiving the binding information via the binding header of the request message allows the SMF instance to perform an alternate routing to other NEF instances located in the same DNN and servicing a particular IMSI range.

When the NEF instance receives mobile originated data, a monitoring report (e.g., a MONTE report), or any other NEF event that requires a notification to be generated towards application function, the NEF instance conducts a check to determine if a configuration from any AF endpoint exists in the shared context databases of the NEF(s) (i.e., that matches the AF identification that is indicated in the message received by the NEF). If a context configuration entry exists in the shared context database, the NEF instance looks for a matching rule in the priority configuration database (e.g., for MO data, a table entry containing the same DNN and within IMSI range as values contained in message received by the NEF instance) previously configured by the network operator.

As indicated above, the priority configuration database can include entries corresponding to "overwrite" and "normal" routing modes. If a matching rule exists in the priority configuration database and the associated routing mode is indicated as "normal", then the NEF instance is configured to route messages to the application function destination endpoint that was defined and/or established during the corresponding context created for a given AF. In the event that original application function endpoint fails or otherwise becomes unavailable, the NEF can utilize the priority configuration database to reference and apply the priorities indicated (and previously established by the network operator in the priority configuration database) to select the alternate AF endpoint in accordance with the network operator's rule.

The "normal" routing mode can also be utilized in instances when an NEF fails. For example, consider the scenario where the NEF1 instance has failed and the NEF2 instance has received the monitoring data and/or the mobile originated data. If the routing mode in the priority configuration database is set to "normal", this is an indication that the alternate NEF2 always first attempts to communicate via a session with AF1, which is proximate to failed NEF1. In the event AF1 also fails, then the configuration table can indicate that NEF2 should continue the session with AF2. Accordingly, "normal" as used herein generally means the NEF instance may continue communicating with the AF, but should the application function endpoint fail, then the NEF instance applies the network operator's rule in the priority configuration database to locate the next available application server for routing.

In contrast, the routing mode "override" means that even if AF1 was the application function that has been configured to communicate with NEF1, an alternative application function can be selected by NEF2 regardless the availability status of AF1. For example, the priority configuration database may indicate that NEF2 has a priority binding with AF2 equal to "priority=1". In this override setting (and if NEF1 fails), NEF2 will immediately attempt to continue the session with AF2 instead of AF1. Override essential means that the initial configuration is being overridden with the priority parameters indicated in the priority configuration table.

Thus, returning the example, if context exists in the context database and a matching rule exists in the priority configuration database but the routing mode is instead set to "override" (as opposed to "normal"), the NEF instance will check if the application function configuration is present for self-instance identification. In some embodiments, each NEF instance can be configured to search for its own instance identifier in table 500 for a matching area and IMSI (e.g., columns 501-502) for purposes of applying the corresponding priority rule (e.g., column 506). For example, NEF1 will look for priority rules associated to its own instance identifier only. If the self-instance identifier is found to exist, the NEF (and/or the priority configuration engine) is configured to use the AF's endpoint identifier (e.g., FQDN/IP address) that is associated with priority 1 for its own instance identifier. For example, the notification URL can be adjusted from context data by the NEF (and/or priority configuration engine) and the rest of the procedure may be run as defined by 3GPP standards for notifications between the NEF and AF. If a "priority 1" AF endpoint is not able to be reached, then the NEF (and/or priority configuration engine) may use an AF endpoint with a lower priority indicator (e.g., priority=2) as the alternate endpoint. If no AF configuration is present for self-instance identification, then the NEF does not send a notification to the application function and subsequently rejects request messages received from the consumer network functions (e.g., AMF, SMF, UDM, etc.).

Alternatively, if context exists in the context database but no matching rule is found in the priority configuration database by the NEF (and/or the priority configuration engine), then the NEF instance that accepted the configuration (and/or its priority configuration engine) is allowed to generate and send a notification message to the application function that created the original context with the NEF. In alternate embodiments, if a given application function endpoint is not available, the NEF instance can perform DNS based alternate routing if the application function endpoint is identifiable by a FQDN and the DNS server of the network operator has multiple IP addresses assigned to that FQDN.

Figure 6:
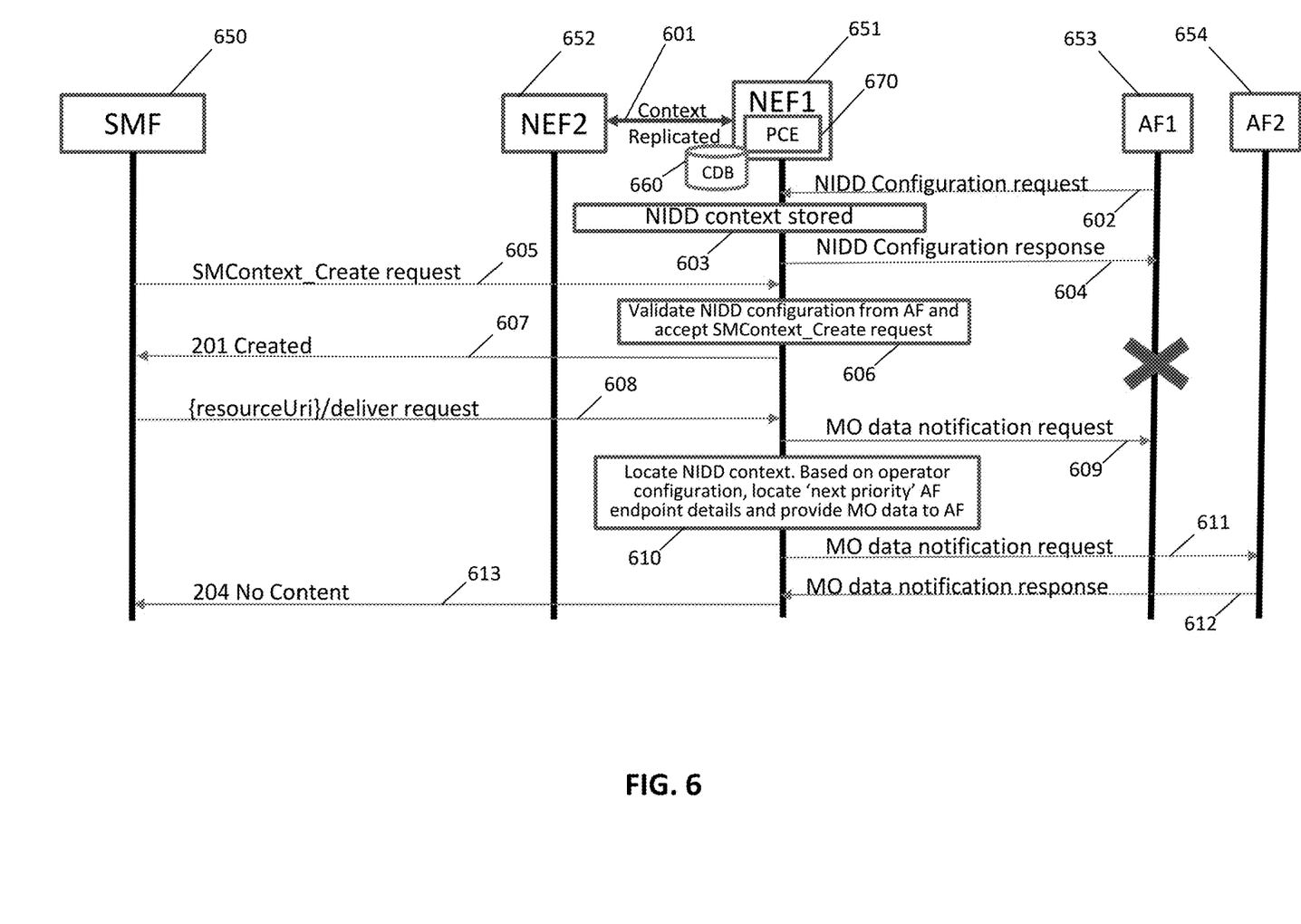
FIG. 6 is a message flow diagram illustrating a NEF routing non-IP data delivery network traffic in response to an application function (AF) failure according to an embodiment of the subject matter described herein.

FIG. 6 is a message flow diagram illustrating a NEF routing non-IP data delivery network traffic in response to an AF failure according to an embodiment of the subject matter described herein. Referring to FIG. 6, NEF1 651 and NEF2 652 are configured to share and/or replicate their local context databases (e.g., see link 601). NEF1 651 is depicted as including a priority configuration engine 670 (e.g., a software and/or state machine element that is responsible for performing the disclosed methodology) and a local priority configuration database 660. In some embodiments, NEF1 651 receives a configuration request message 602 (e.g., an NIDD configuration request) from AF1 653. After receiving configuration request message 602, NEF1 651 stores the NIDD context information contained within configuration request message 602 in a shared context database. Once the context information is stored in the context database, NEF 651 sends a configuration response message 604 (e.g., an NIDD configuration response) to AF1 653.

After storing the NIDD context information, NEF 651 receives a context creation request message 605 (e.g., SMContext_Create request) from SMF 650, which is supporting one or more subscriber user equipment. In response to receiving request message 605, NEF1 651 (and/or its priority configuration engine 670) can access the shared context database and validate the previously stored NIDD configuration from AF1 653. If the configuration is valid, NEF1 651 (and/or its priority configuration engine 670) may accept and process context creation request message 605. At this stage, NEF1 651 may be configured to send a context creation acknowledgment message 607 to SMF 650. SMF 650 can subsequently send a MO delivery request message 608 (e.g., a {resourceURl}/deliver request message) that contains mobile originated data from a sending user equipment (not shown) that is serviced by SMF 650. After receiving delivery request message 608, NEF1 651 attempts to send a mobile originated data notification request message 609 to AF1 653. However, at some point after receiving configuration response message 604, AF1 653 failed or otherwise became unavailable in the network (see "X" in FIG. 6). As such, NEF1 651 never receives a mobile originated data notification response message from unavailable AF1 653 in response to the previously sent MO data notification request message 609. As such, NEF1 651 attempts to find NIDD context information in the local priority configuration database 660. Based on the operator configuration, NEF 651 is able to find the 'next priority' AF endpoint details in the priority configuration database 660. Once the appropriate application function endpoint (e.g., AF2 is associated with priority=2 for NEF1) is determined, NEF1 651 sends the mobile originated data to the identified application function (e.g., AF2 654). In particular, NEF 651 sends a mobile originated data notification request message 611 to identified AF2 654. After receiving the notification request message 611, AF 654 responds by directing a mobile originated data notification response message 612 to NEF1 651. NEF1 651 subsequently sends a no content acknowledgment message 613 to SMF 650 to indicate the delivery was successful.

Figure 7:
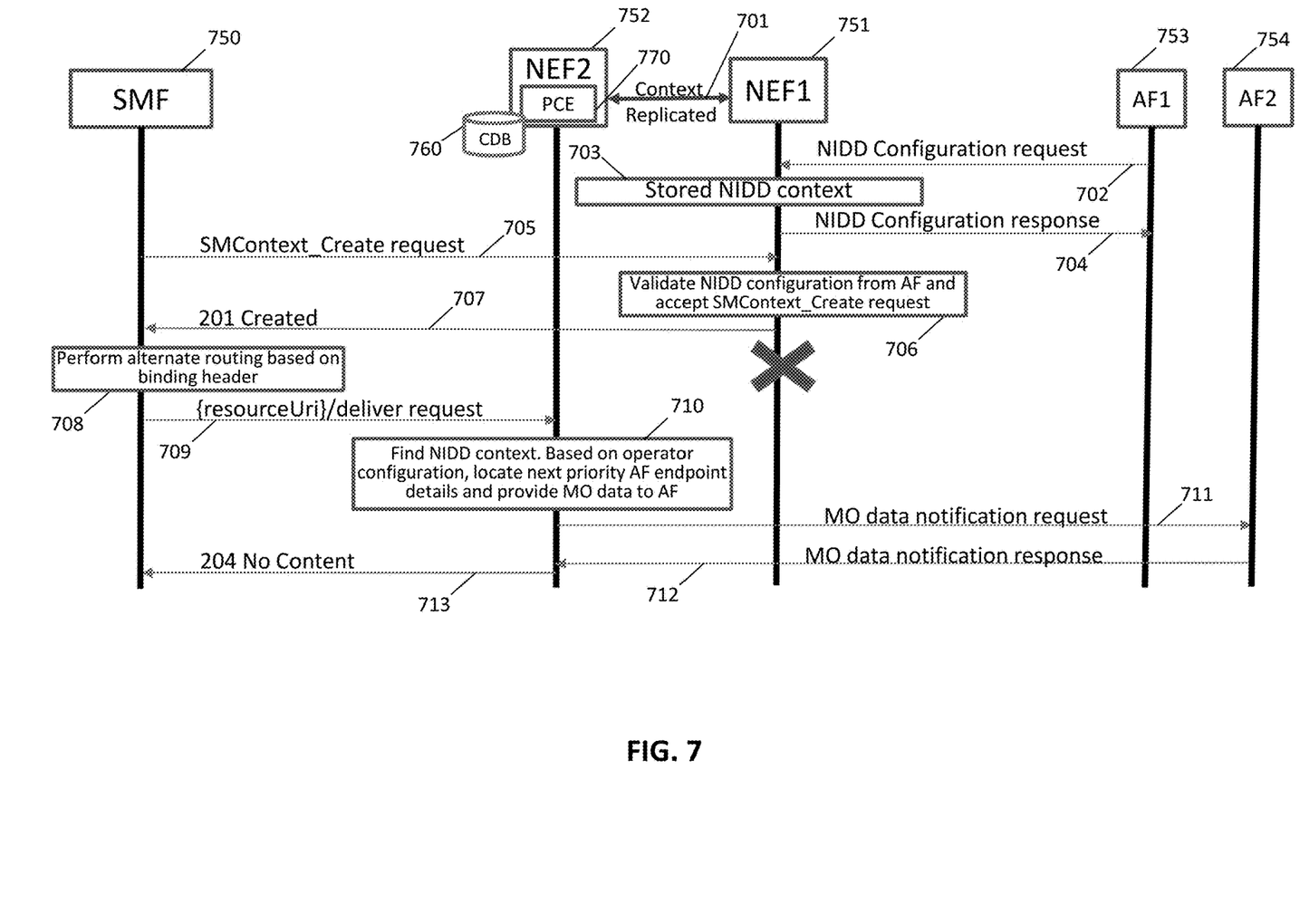
FIG. 7 is a message flow diagram illustrating a NEF monitoring network traffic in response to an NEF failure according to an embodiment of the subject matter described herein.

FIG. 7 is a message flow diagram illustrating a network exposure function (NEF) monitoring network traffic in response to an NEF failure according to an embodiment of the subject matter described herein. Referring to FIG. 7, NEF1 751 and NEF2 752 share and/or replicate their local context databases (see link 701). Further, NEF2 752 is depicted as including a priority configuration engine 770 (e.g., a software and/or state machine element that is responsible for performing the disclosed methodology) and a local priority configuration database 760. In some embodiments, NEF1 751 receives a configuration request message 702 (e.g., a NIDD configuration request) from AF1 753. After receiving configuration request message 702, NEF1 751 stores the NIDD context information contained in configuration request message 702 in the context database. Once the information is stored in the context database, NEF1 751 sends a configuration response message 704 (e.g., NIDD configuration response) to AF1 753.

After storing the NIDD context information, NEF1 751 receives a context creation request message 705 (e.g., SMContext_Create request) from SMF 750. In response to receiving request message 705, NEF1 751 can be configured to validate the previously stored NIDD configuration related to AF1 753. If the NIDD configuration is valid, NEF1 751 may accept and process context creation request message 705. At this stage, NEF1 751 may also send a context creation acknowledgment message 707 (e.g., a '201 Created message') to SMF 750 to indicate the successful validation. In the depicted scenario, NEF1 751 fails or otherwise becomes unavailable after sending acknowledgment message 707 (as shown by "X" in FIG. 7).

In response to receiving acknowledgment message 707, SMF 750 can perform an alternate routing (see block 708) based on the binding header information previously received in message 707. SMF 750 may then send to alternate NEF2 752 a MO delivery request message 709 (e.g., a {resourceURl}/deliver request message) that contains mobile originated data from a sending user equipment (not shown) serviced by SMF 750.

After receiving delivery request message 709, NEF2 752 (and/or priority configuration engine 770) attempts to find NIDD context information in its local context database. Based on the operator configuration, NEF2 752 is able to find the 'next priority' AF endpoint information in the priority configuration database 760. In this example, NEF2 752 is primarily bound to AF2 754 as opposed to application function 753 (which was primarily bound to NEF1 751). Once the appropriate AF endpoint is determined and assuming the priority configuration database entry indicates the "override" setting, NEF2 752 sends the MO data to the newly identified application function (e.g., AF2 754). In particular, NEF2 752 sends a mobile originated data notification request message 711 to identified AF2 754. After receiving the notification request message 711, AF2 754 responds by directing a mobile originated data notification response message 712 to NEF2 752. NEF2 752 subsequently sends a no content acknowledgment message 713 to SMF 750 indicating the successful delivery.

Figure 8:
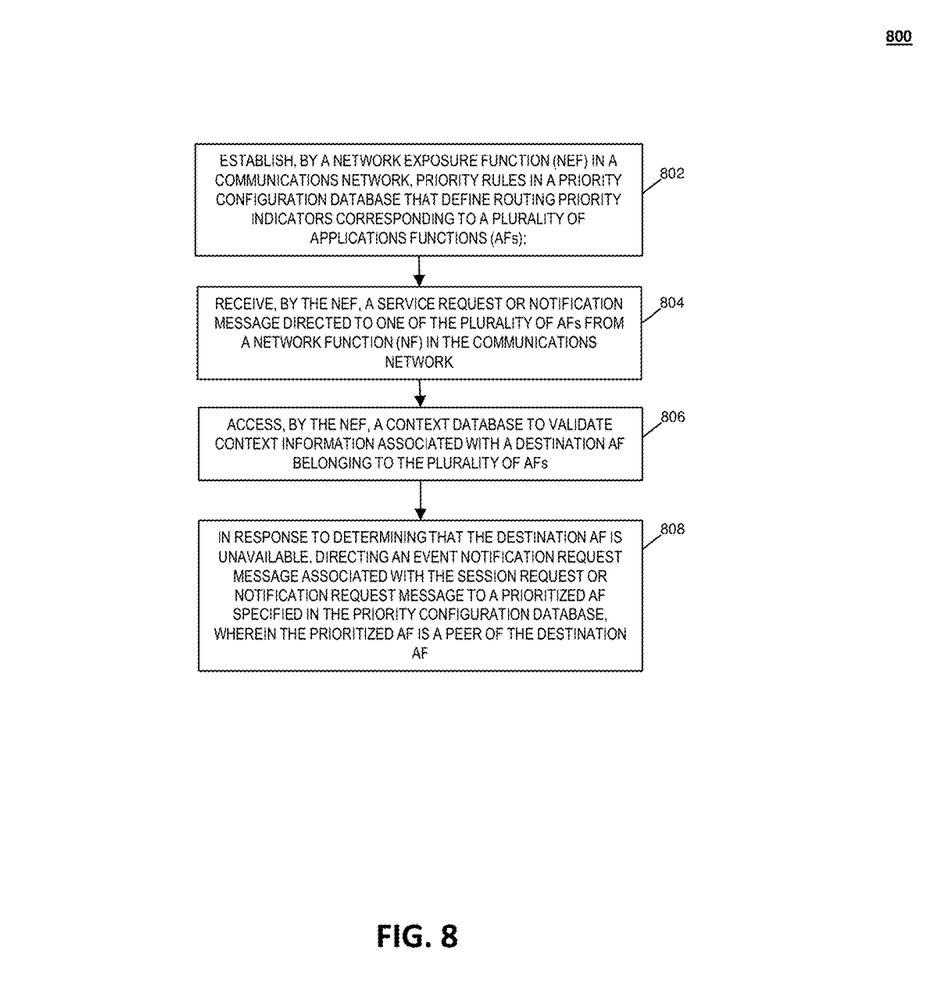
FIG. 8 is a flow chart illustrating an example process for identifying alternate delivery endpoints for mobile originated (MO) data and monitoring reports in a communications network a communications network according to an embodiment of the subject matter described herein.

FIG. 8 is a flow chart illustrating an example process for identifying alternate delivery endpoints for mobile originated (MO) data and monitoring reports in a communications network a communications network according to an embodiment of the subject matter described herein. In some embodiments, method 800 depicted in FIG. 8 is an algorithm, program, or script (e.g., priority configuration engine 660 and 760 as shown in FIGS. 6 and 7, respectively) stored in memory that when executed by a processor performs the steps recited in blocks 802-808. In some embodiments, priority configuration engine represents a list of steps (or changes in steps) embodied in a state machine (e.g., either via software code programming or via a set of rules) of the NEF.

In block 802, priority rules are established in a priority configuration database that define routing priority indicators corresponding to a plurality of applications functions. In some embodiments, the priority rules are established by a NEF in a communications network and/or by a supported priority configuration engine.

In block 804, a service request or notification request message directed to one of the plurality of AFs is received by the NEF from a consumer network function (NF) in the communications network. In some embodiments, the service request or notification request message received from the consumer NF can be an SMContext create request message received from a SMF in the communications network. Alternatively, the received service request or notification request message can be from an AMF or UDM function in the communications network.

In block 806, a context database is accessed by the NEF to validate context information associated with a destination AF belonging to the plurality of AFs. In some embodiments, the NEF validates the previously established context corresponding to the session existing between the destination AF and the NEF.

In block 808, in response to determining that the destination AF is unavailable, an event notification request (e.g., a MONTE report notification request or a MO data notification request) message associated with the service request or notification request message is directed to a prioritized AF specified in the priority configuration database, wherein the prioritized AF is a peer of the destination AF. In some embodiments, the NEF determines that the destination AF has failed or is otherwise unavailable and attempts to utilize the priority configuration database identify a related AF that can support the service request of the consumer NF. For example, the NEF can use DNN and/or IMSI data included in the service request or notification request message can be utilized to identify a related AF (e.g., a peer of the original destination AF) based on specified priority identifier information in the manner described above.

It should be noted that disclosed subject matter provides a practical solution for supporting alternate routing capabilities that permits a network operator to promptly manage AF failures or downtime scenarios by failing over to an alternate AF or routing to a closest proximity application function with "override" routing mode. Notably, the disclosed solution enables high availability between the network operator's NEF and the AF instances hosted by one or more vendor entities. The disclosed solution also does not require any custom features or behavioral changes in the supported AF or any other components. As such, the disclosed methodology provides a technical advancement due to its efficiency in terms of maintainability and serviceability by the network operator. It should also be noted that the solution is fully backward compatible and controlled via network operator configurations, thus there are no violations of 3GPP defined procedures.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:
1. A method comprising:
  establishing, by a network exposure function (NEF) in a communications network, priority rules in a priority configuration database that define routing priority indicators corresponding to a plurality of applications functions (AFs), wherein the routing priority indicators include a priority order of the plurality of AFs, specific to an identity of the NEF, that designate an order in which the NEF attempts to utilize the plurality of AFs for establishing a session;

receiving, by the NEF, a service request or notification request message directed to one of the plurality of AFs from a network function (NF) in the communications network;

accessing, by the NEF, a context database to validate context information associated with a destination AF belonging to the plurality of AFs; and in response to determining that the destination AF is unavailable or is not in proximity to the NEF, directing, by the NEF, an event notification request message associated with the service request or notification request message to a prioritized AF specified in the priority configuration database, wherein the prioritized AF is a peer of the destination AF.

2. The method of claim 1 wherein the NF request message received from the NF is a mobile originated (MO) deliver request message received from a session management function (SMF) in the communications network.

3. The method of claim 1 wherein the service request or notification request message received from the NF is a monitoring report message received from a Access and Mobility Management Function (AMF) or Unified Data Management (UDM) in the communications network.

4. The method of claim 1 wherein the notification request message is directed to the prioritized AF if an entry identifying the prioritized AF in the priority configuration database further includes a parameter indicating an override condition.

5. The method of claim 1 wherein the priority configuration database is auto-replicated among a plurality of NEFs in a NF set or NF service set related to the NEF.

6. The method of claim 1 comprising providing, by the NEF, priority binding information associated with the priority rules via request messages directed to a plurality of consumer NFs in the communications network.

7. The method of claim 1 wherein entries of the priority configuration database maps each of a plurality of NEF instances to a plurality of application functions, wherein each application function is identified by a context identifier and a priority identifier.

8. A system comprising:
at least one processor;
a memory; and
a network exposure function (NEF) in a communications network that is implemented using the at least one processor and the memory, the NEF configured for:
establishing priority rules in a priority configuration database that define routing priority indicators corresponding to a plurality of applications functions (AFs), wherein the routing priority indicators include a priority order of the plurality of AFs, specific to an identity of the NEF, that designate an order in which the NEF attempts to utilize the plurality of AFs for establishing a session;
receiving a service request or notification request message directed to one of the plurality of AFs from a consumer network function (NF) in the communications network;
accessing a context database to validate context information associated with a destination AF belonging to the plurality of AFs; and
in response to determining that the destination AF is unavailable or is not in proximity to the NEF, directing, by the NEF, an event notification request message associated with the service request or notification request message to a prioritized AF specified in the priority configuration database, wherein the prioritized AF is a peer of the destination AF.

9. The system of claim 8 wherein the NF request message received from the NF is a mobile originated (MO) deliver request message received from a session management function (SMF) in the communications network.

10. The system of claim 8 wherein the Service request or notification request message received from the NF is a monitoring report request message received from a Access and Mobility Management Function (AMF) or Unified Data Management (UDM) in the communications network.

11. The system of claim 8 wherein the notification request message is directed to the prioritized AF if an entry identifying the prioritized AF in the priority configuration database further includes a parameter indicating an override condition.

12. The system of claim 8 wherein the priority configuration database is auto-replicated among a plurality of NEFs in a NF set or NF service set related to the NEF.

13. The system of claim 8 wherein the NEF is further configured for providing priority binding information associated with the priority rules via request messages directed to a plurality of consumer NFs in the communications network.

14. The system of claim 8 wherein entries of the priority configuration database maps each of a plurality of NEF instances to a plurality of application functions, wherein each application function is identified by a context identifier and a priority identifier.

15. A non-transitory computer readable medium having stored thereon executable instructions that when executed by at least one processor of a computer cause the computer to perform steps comprising:
establishing, by a network exposure function (NEF) in a communications network, priority rules in a priority configuration database that define routing priority indicators corresponding to a plurality of applications functions (AFs), wherein the routing priority indicators include a priority order of the plurality of AFs, specific to an identity of the NEF, that designate an order in which the NEF attempts to utilize the plurality of AFs for establishing a session;
receiving, by the NEF, a service request or notification request message directed to one of the plurality of AFs from a consumer network function (NF) in the communications network;
accessing, by the NEF, a context database to validate context information associated with a destination AF belonging to the plurality of AFs; and
in response to determining that the destination AF is unavailable or is not in proximity to the NEF, directing, by the NEF, an event notification request message associated with the service request or notification request message to a prioritized AF specified in the priority configuration database, wherein the prioritized AF is a peer of the destination AF.

16. The non-transitory computer readable medium of claim 15 wherein the NF request message received from the NF is a mobile originated (MO) deliver request message received from a session management function (SMF) in the communications network.

17. The non-transitory computer readable medium of claim 15 wherein the service request or notification request message received from the NF is a monitoring report request message received from a Access and Mobility Management Function (AMF) or Unified Data Management (UDM) in the communications network.

18. The non-transitory computer readable medium of claim 15 wherein the notification request message is directed to the prioritized AF if an entry identifying the prioritized AF in the priority configuration database further includes a parameter indicating an override condition.

19. The non-transitory computer readable medium of claim 15 wherein the priority configuration database is auto-replicated among a plurality of NEFs in a NF set or NF service set related to the NEF.

20. The non-transitory computer readable medium of claim 15 comprising providing, by the NEF, priority binding information associated with the priority rules via request messages directed to a plurality of consumer NFs in the communications network.

* * * * *